United States Patent
Konishi et al.

(10) Patent No.: US 10,397,861 B2
(45) Date of Patent: Aug. 27, 2019

(54) COMMUNICATION SYSTEM, VEHICLE-MOUNTED APPARATUS, AND RECORDING MEDIUM RECORDING PROGRAM

(71) Applicant: Panasonic Intellectual Property Corporation of America, Torrance, CA (US)

(72) Inventors: Kazunobu Konishi, Osaka (JP); Ryota Ohnishi, Hyogo (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/949,313

(22) Filed: Apr. 10, 2018

(65) Prior Publication Data

US 2018/0310242 A1 Oct. 25, 2018

(30) Foreign Application Priority Data

Apr. 20, 2017 (JP) .................. 2017-083899

(51) Int. Cl.
*H04W 4/00* (2018.01)
*H04W 48/20* (2009.01)
(Continued)

(52) U.S. Cl.
CPC .......... *H04W 48/20* (2013.01); *G08G 1/0116* (2013.01); *G08G 1/091* (2013.01);
(Continued)

(58) Field of Classification Search
CPC ....... H04W 48/20; H04W 4/44; H04W 4/023; H04W 12/06; H04W 48/10;
(Continued)

(56) References Cited

U.S. PATENT DOCUMENTS

| 8,483,612 B2 * | 7/2013 | Yamamoto ............. G08G 1/093 |
| | | 455/41.2 |
| 2007/0005609 A1 | 1/2007 | Breed |
| (Continued) | | |

FOREIGN PATENT DOCUMENTS

JP    2006-304005    11/2006

OTHER PUBLICATIONS

The Extended European Search Report from the European Patent Office dated Sep. 28, 2018 for the related European Patent Application No. 18167194.2.

*Primary Examiner* — Danh C Le
(74) *Attorney, Agent, or Firm* — Greenblum & Bernstein, P.L.C.

(57) ABSTRACT

A vehicle-mounted apparatus that is capable of wireless connection with a roadside device is provided. The roadside device is on, above, or below a road. The vehicle-mounted apparatus is on a vehicle and acquires position information broadcast from the roadside device by wireless communication. The position information is about a position of the roadside device. The vehicle-mounted apparatus decides whether individual wireless connection is performed between the roadside device and the vehicle-mounted apparatus based on roadside device information. The roadside device information includes the position information about the position of the roadside device. Connection or disconnection of individual wireless connection is performed between the vehicle-mounted apparatus and the roadside device based on the decision. Periphery information of the roadside device is acquired from the roadside device during the individual wireless connection in response to the individual wireless connection being connected.

19 Claims, 6 Drawing Sheets

(51) Int. Cl.
*H04W 4/44* (2018.01)
*H04W 64/00* (2009.01)
*H04W 48/10* (2009.01)
*G08G 1/16* (2006.01)
*H04W 4/02* (2018.01)
*G08G 1/01* (2006.01)
*G08G 1/0968* (2006.01)
*H04W 12/06* (2009.01)
*G08G 1/09* (2006.01)
*G08G 1/0967* (2006.01)

(52) U.S. Cl.
CPC ....... *G08G 1/0968* (2013.01); *G08G 1/09675* (2013.01); *G08G 1/096716* (2013.01); *G08G 1/096783* (2013.01); *G08G 1/164* (2013.01); *H04W 4/023* (2013.01); *H04W 4/44* (2018.02); *H04W 12/06* (2013.01); *H04W 48/10* (2013.01); *H04W 64/003* (2013.01)

(58) Field of Classification Search
CPC . H04W 64/003; G08G 1/0116; G08G 1/0986; G08G 1/164
USPC .................. 455/434, 456.6, 550.1, 569.2
See application file for complete search history.

(56) References Cited

U.S. PATENT DOCUMENTS

| | | | | |
|---|---|---|---|---|
| 2009/0154379 | A1* | 6/2009 | Hayashi | H04W 72/04 370/280 |
| 2010/0211310 | A1* | 8/2010 | Hotta | G01C 21/3629 701/533 |
| 2010/0286896 | A1* | 11/2010 | Yamada | B60Q 1/085 701/117 |
| 2010/0321056 | A1* | 12/2010 | Strom | G01R 1/07342 324/755.01 |
| 2010/0321206 | A1* | 12/2010 | Kuga | G01C 21/3679 340/905 |
| 2011/0012756 | A1* | 1/2011 | Yamamoto | H04W 4/04 340/905 |
| 2011/0035089 | A1* | 2/2011 | Hirao | B60G 17/06 701/31.4 |
| 2012/0226391 | A1* | 9/2012 | Fryer | G08G 1/202 701/1 |
| 2016/0187303 | A1* | 6/2016 | Chang | G01N 29/4427 340/991 |
| 2017/0116731 | A1* | 4/2017 | Tsunomori | G06T 7/0012 |
| 2017/0166122 | A1* | 6/2017 | Ando | B60Q 9/00 |
| 2017/0182934 | A1* | 6/2017 | Arita | B60Q 1/50 |
| 2017/0349097 | A1* | 12/2017 | Nishimura | G06K 9/00818 |
| 2017/0368897 | A1* | 12/2017 | Brickley | H04L 67/12 |
| 2018/0018877 | A1* | 1/2018 | Townsend | G08G 1/056 |
| 2018/0018888 | A1* | 1/2018 | Townsend | B60Q 9/008 |

* cited by examiner

COMMUNICATION SYSTEM, VEHICLE-MOUNTED APPARATUS, AND RECORDING MEDIUM RECORDING PROGRAM

BACKGROUND

1. Technical Field

The present disclosure relates to a communication system, a vehicle-mounted apparatus, and a recording medium recording a program, particularly to a communication system, a vehicle-mounted apparatus, and a recording system recording a program that are related to communication between a vehicle and a roadside device.

2. Description of the Related Art

In recent years, development of technologies for provision of safe driving support and realization of autonomous driving has been progressing. In the development of technologies, as a technical measure in which a driver and a vehicle perceive dynamic information such as the positions of moving objects (moving bodies), which are related to safe running, such as surrounding vehicles, pedestrians, and bicycles and situations of traffic signals, a dynamic map has been attracting attention. A dynamic map is a map in which dynamic information which temporally changes is superimposed on a static map as a map which does not temporally change. In creation and delivery of the dynamic map, for example, a map and dynamic information such as vehicles and pedestrians are wirelessly delivered from an infrastructure apparatus such as a roadside device on a road to a vehicle. The vehicle connects with wireless devices of plural roadside devices while moving and receives information about the dynamic map. Here, in order to receive the information about the dynamic map that is delivered from the roadside device, the vehicle selects the requested roadside device from the plural roadside devices and connects with the roadside device. In order to perform connection with a wireless access point of the roadside device for performing wireless connection, the vehicle selects an access point from plural access points and connects with the access point. For example, Japanese Unexamined Patent Application Publication No. 2006-304005 discloses a technique for selecting and authenticating an access point from plural access points in a wireless local area network (LAN) system. Beacon information is sent from the access point to a wireless terminal, and the beacon information includes a network congestion degree and the physical position of the wireless terminal.

SUMMARY

In Japanese Unexamined Patent Application Publication No. 2006-304005, a wireless terminal selects an access point based on beacon information and connects with the access point. For example, in a case where the access point is a roadside device, each roadside device may mainly send periphery information thereof. Thus, in a case where the access point is selected based on a network congestion degree and the physical position of a wireless terminal as disclosed in Japanese Unexamined Patent Application Publication No. 2006-304005, the roadside device on another route than the running route of the vehicle may be connected with the vehicle, and it is thus possible that the information that is requested by the vehicle may not be obtained. Further, in a case where the vehicle connects with all the access points, the network is congested, and the communication rate is lowered.

One non-limiting and exemplary embodiment provides a communication system, a vehicle-mounted apparatus, and a recording medium recording a program that enable connection with an appropriate access point.

In one general aspect, the techniques disclosed here feature a communication system including: a roadside device that is placed on a road; and a vehicle-mounted apparatus that is mounted on a vehicle. The roadside device includes: a sensor that detects a peripheral situation of the roadside device; and first processing circuitry that, in operation, performs first operations including acquiring a detection result of the sensor and map information of the roadside device, acquiring information about a position of the roadside device from the detection result of the sensor and the map information of the roadside device, broadcasting information which includes the information about the position of the roadside device by wireless communication, acquiring periphery information of the roadside device from the detection result of the sensor and the map information of the roadside device, authenticating individual wireless connection between the vehicle-mounted apparatus and the roadside device, and transmitting the periphery information of the roadside device to the vehicle-mounted apparatus by the individual wireless connection. The vehicle-mounted apparatus includes second processing circuitry that, in operation, performs second operations including acquiring the broadcast information by wireless communication, acquiring the information about the position of the roadside device from the acquired information, controlling the individual wireless connection between the vehicle-mounted apparatus and the roadside device, acquiring the periphery information of the roadside device by the individual wireless connection, deciding whether or not the individual wireless connection is performed between the roadside device and the vehicle-mounted apparatus based on roadside device information, the roadside device information including the information about the position of the roadside device, and connecting or disconnecting the individual wireless connection between the vehicle-mounted apparatus and the roadside device based on the deciding.

A communication system and so forth according to the present disclosure enable connection with an appropriate access point.

It should be noted that general or specific embodiments may be implemented as a system, a device, a method, an integrated circuit, a computer program, a computer-readable recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
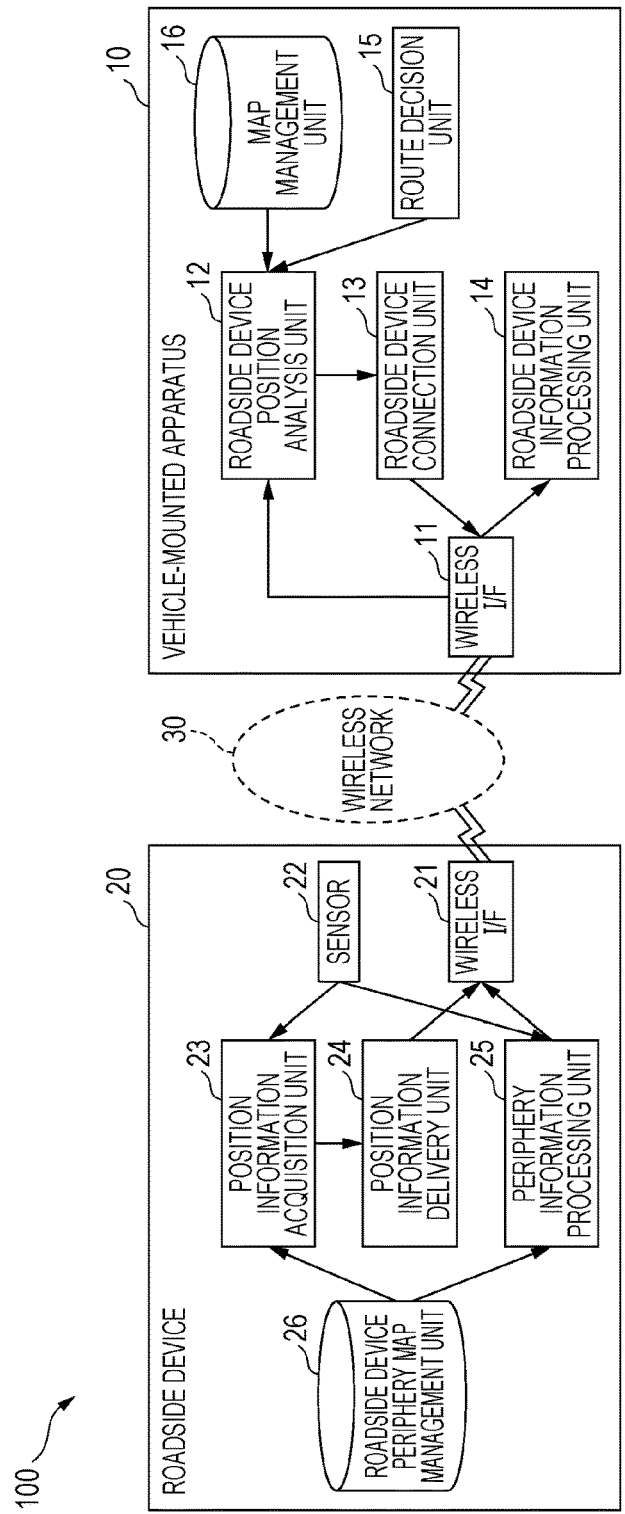
FIG. 1 is a block diagram that illustrates one example of a functional configuration of a communication system according to a first embodiment.

The inventors related to the present disclosure, that is, the present inventors discussed the technique disclosed in Japanese Unexamined Patent Application Publication No. 2006-304005, which is raised in "Description of the Related Art", and discussed a technique for selecting an access point and connecting with the access point. For example, a vehicle-mounted apparatus that is mounted on a vehicle moves together with the vehicle in accordance with the traveling route that is decided by a car navigation system. The vehicle and a driver thereof request information of the traveling route and a periphery thereof. Thus, the vehicle-mounted apparatus desirably connects with a roadside device as the access point positioned in the traveling route and the periphery thereof and thereby acquires the requested information from the roadside device. Thus, in order to enable connection of a wireless terminal of the vehicle-mounted apparatus or the like with an appropriate access point such that the access point positioned in the traveling route and the periphery thereof is selected from the access points, the present inventors have found techniques that will be described in the following.

A communication system according to one aspect of the present disclosure includes: a roadside device that is placed on a road; and a vehicle-mounted apparatus that is mounted on a vehicle. The roadside device includes a sensor that detects a peripheral situation of the roadside device; and first processing circuitry that, in operation, performs first operations including acquiring a detection result of the sensor and map information of the roadside device, acquiring information about a position of the roadside device from the detection result of the sensor and the map information of the roadside device, broadcasting information which includes the information about the position of the roadside device by wireless communication, acquiring periphery information of the roadside device from the detection result of the sensor and the map information of the roadside device, authenticating individual wireless connection between the vehicle-mounted apparatus and the roadside device, and transmitting the periphery information of the roadside device to the vehicle-mounted apparatus by the individual wireless connection. The vehicle-mounted apparatus includes second processing circuitry that, in operation, performs second operations including acquiring the broadcast information by wireless communication, acquiring the information about the position of the roadside device from the acquired information, controlling the individual wireless connection between the vehicle-mounted apparatus and the roadside device, acquiring the periphery information of the roadside device by the individual wireless connection, deciding whether or not the individual wireless connection is performed between the roadside device and the vehicle-mounted apparatus based on roadside device information, the roadside device information including the information about the position of the roadside device, and connecting or disconnecting the individual wireless connection between the vehicle-mounted apparatus and the roadside device based on the deciding.

In the above aspect, the vehicle-mounted apparatus acquires the information about the position of the roadside device and decides whether or not the individual wireless connection is performed between the roadside device and the vehicle-mounted apparatus based on the acquired information. Accordingly, the roadside device in the position that is irrelevant to the vehicle may be excepted from connection targets of wireless connection. As a result, the vehicle-mounted apparatus may sort an appropriate roadside device even in a case where the position of the roadside device is not in advance recognized and perform wireless connection with the sorted roadside device. Thus, the vehicle-mounted apparatus may decrease unnecessary wireless connection with the roadside device for obtaining the periphery information of the roadside device. Consequently, the communication system enables connection with an appropriate access point by the vehicle-mounted apparatus. Note that because the data amount of the information about the position of the roadside device may be regulated to a small amount, the load to the wireless network may be regulated to a low load even in a case where the information is broadcast. Even in a case where the data amount of the periphery information of the roadside device becomes large, it is possible to secure a proper communication environment because the number of wireless connection targets of the vehicle-mounted apparatus may be regulated.

In the communication system according to one aspect of the present disclosure, the first operations may further include acquiring information about a detection range of the roadside device from the detection result of the sensor and the map information of the roadside device, and broadcasting the information about the position of the roadside device and information about the detection range, and the second operations may further include deciding whether or not the individual wireless connection is performed between the roadside device and the vehicle-mounted apparatus based on the roadside device information, the roadside device information including the information about the position of the roadside device and the information about the detection range.

In the above aspect, the vehicle-mounted apparatus acquires the information about the position and the detection range of the roadside device and decides whether or not the individual wireless connection is performed between the roadside device and the vehicle-mounted apparatus based on the acquired information. Accordingly, the roadside device whose detection range is irrelevant to the vehicle may be excepted from connection targets of wireless connection. Thus, the number of roadside devices with which the vehicle-mounted apparatus performs wireless connection is regulated to a small number. As a result, the vehicle-mounted apparatus may sort a further appropriate roadside device and perform wireless connection.

In the communication system according to one aspect of the present disclosure, the second operations may further include acquiring information of a planned traveling route of the vehicle, and the deciding may be deciding that the individual wireless connection is performed between the roadside device and the vehicle-mounted apparatus in a case where the planned traveling route is related with the roadside device information.

In the above aspect, in a case where the planned traveling route of the vehicle is related with the roadside device information, the individual wireless connection is performed between the roadside device and the vehicle-mounted apparatus. Thus, the vehicle-mounted apparatus sorts the roadside device that has requested periphery information in a running procedure of the vehicle and performs wireless connection. Consequently, the connection with an appropriate access point by the vehicle-mounted apparatus is enabled.

In the communication system according to one aspect of the present disclosure, the communication system may further include plural roadside devices, each of the plural roadside devices being the roadside device, the broadcasting may be wireless communication via a network that has the plural roadside devices as access points, and the individual wireless connection between the roadside device and the vehicle-mounted apparatus may be wireless communication via a network that has the roadside device as the access point.

In the above aspect, a network used for broadcast from an information delivery unit and a network used for the individual wireless connection between the roadside device and the vehicle-mounted apparatus are separately set, and mutual interference may thus be regulated.

A vehicle-mounted apparatus according to one aspect of the present disclosure is a vehicle-mounted apparatus that is capable of wireless connection with a roadside device which is placed on a road and that is mounted on a vehicle. The vehicle-mounted apparatus includes: storage; and processing circuitry that, in operation, performs operations including acquiring information that is broadcast from the roadside device by wireless communication, the information including information about a position of the roadside device, controlling individual wireless connection between the vehicle-mounted apparatus and the roadside device, acquiring periphery information of the roadside device from the roadside device during the individual wireless connection between the vehicle-mounted apparatus and the roadside device, deciding whether or not the individual wireless connection is performed between the roadside device and the vehicle-mounted apparatus based on roadside device information, the roadside device information including the information about the position of the roadside device, and connecting or disconnecting the individual wireless connection between the vehicle-mounted apparatus and the roadside device based on the deciding. The above aspect may provide similar effects to the communication system according to one aspect of the present disclosure.

In the vehicle-mounted apparatus according to one aspect of the present disclosure, the operations may further include acquiring roadside device information that is the information about the position of the roadside device and information about the detection range of the roadside device from the roadside device, and deciding whether or not the individual wireless connection is performed between the roadside device and the vehicle-mounted apparatus based on the roadside device information.

In the vehicle-mounted apparatus according to one aspect of the present disclosure, the operations may further include acquiring information of a planned traveling route of the vehicle, and the deciding may be deciding that the individual wireless connection is performed between the roadside device and the vehicle-mounted apparatus in a case where the planned traveling route is related with the roadside device information.

In the vehicle-mounted apparatus according to one aspect of the present disclosure, the broadcasting may be wireless communication via a network that has plural roadside devices as access points, each of the plural roadside devices being the roadside device, and the individual wireless connection between the roadside device and the vehicle-mounted apparatus may be wireless communication via a network that has the roadside device as the access point.

A computer-readable non-transitory recording medium according to one aspect of the present disclosure records a program. The program that is executed by a computer causes the computer to execute a process including: acquiring information that is broadcast from a roadside device which is placed on a road by wireless communication, the information including information about a position of the roadside device; deciding whether or not individual wireless connection with the roadside device is performed based on the information about the position of the roadside device; executing connection or disconnection of wireless connection with the roadside device based on the deciding; and acquiring periphery information of the roadside device from the roadside device during the individual wireless connection with the roadside device.

Note that the present disclosure may be realized not only as a system and a device but also realized as an integrated circuit that includes a processing measure which is included in such a system or a device, realized as a method that has the processing measure which configures the system or the device as steps, realized as a program that causes a computer to execute the steps, or realized as information, data, or signals that indicate the program. Further, the program, information, data, and signals may be delivered via computer-readable recording media or communication media such as the Internet. The computer-readable recording medium includes non-volatile recording medium such as a compact disc-read only memory (CD-ROM), for example.

Embodiments will be described hereinafter with reference to drawings. Note that all the embodiments described in the following merely illustrate specific examples. Values, shapes, materials, configuration elements, arrangement positions or connection manners of configuration elements, steps, orders of steps, and so forth that are described in the following embodiments are only examples and are not intended to limit the present disclosure. Further, the configuration elements that are not described in the independent claims which provide the most superordinate concepts among the configuration elements in the following embodiments will be described as arbitrary configuration elements. Further, in expressions, ordinal numbers such as first, second, and third may appropriately be added to the configuration elements and so forth.

Further, in the descriptions of the following embodiments, expressions accompanying "substantially" such as substantially parallel and substantially orthogonal may be used. For example, substantially parallel not only means being perfectly parallel but also means being substantively parallel, in other words, including differences of approximately several percent, for example. This also applies to other expressions accompanying "substantially". Further, the diagrams are outline diagrams and are not necessarily strictly illustrated. In addition, in the diagrams, the same reference characters are given to substantively the same configuration elements, and repeated descriptions may not be made or may be simplified.

First Embodiment

Figure 2:
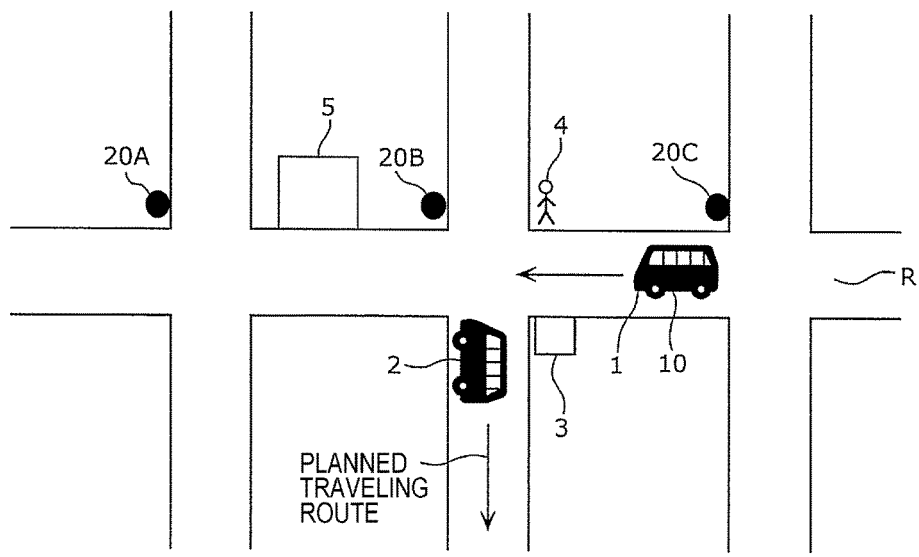
FIG. 2 is a schematic diagram that illustrates an application example of the communication system according to the first embodiment.

First, referring to FIG. 1 and FIG. 2, a configuration of a communication system 100 according to a first embodiment will be described. FIG. 1 is a block diagram that illustrates one example of a functional configuration of the communication system 100 according to the first embodiment. FIG. 2 is a schematic diagram that illustrates an application example of the communication system 100 according to the first embodiment. Note that in the following embodiment, a description will be made on an assumption that in the communication system, an infra-structure device that sends information is a roadside device and a wireless terminal that receives the information from the infra-structure device is a vehicle-mounted apparatus. The infra-structure device may be run by either one of a public service or a private service and is a device that provides various kinds of information to users through the public service or the private service.

As illustrated in FIG. 1, the communication system 100 includes a roadside device 20 that is arranged on a side of, above or below a road, for example, and a vehicle-mounted apparatus 10 that is mounted on a vehicle which runs on a road. The vehicle-mounted apparatus 10 and the roadside device 20 are connected with each other via a wireless network 30. Although not limited, in this embodiment, the wireless network 30 is a wireless LAN. For example, the wireless network 30 may be a wireless LAN for which a communication license is not requested and may be Wireless Fidelity (Wi-Fi®) that uses a standard of IEEE 802.11 series which is an international standard, for example. However, the wireless network 30 may be any wireless medium as long as the wireless medium broadcasts wireless information and may be near-field communication such as Bluetooth® or ZigBee®, for example.

For example, referring to FIG. 2, on a road R, plural roadside devices 20A, 20B, and 20C are arranged on a side of the road R at intervals from each other. Each of the roadside devices 20A to 20C scans the inside of a prescribed range such as a range of a prescribed radius and sends information of a situation of the inside of the prescribed range to the vehicle-mounted apparatus 10 that is mounted on a vehicle 1. The vehicle-mounted apparatus 10 performs wireless connection with the roadside devices 20A to 20C and thereby acquires information from the wirelessly connected roadside devices 20A to 20C. The information that is sent by the roadside devices 20A to 20C may include position information and so forth of another vehicle 2, an obstacle 3, a pedestrian 4, a building 5, and so forth, which are present on the road R and a periphery thereof.

As illustrated in FIG. 1, the roadside device 20 includes a wireless interface (I/F) 21, a sensor 22, a position information acquisition unit 23, a position information delivery unit 24, a periphery information processing unit 25, and a roadside device periphery map management unit 26. The position information delivery unit 24 is one example of an information delivery unit.

The wireless I/F 21 wirelessly communicates with the vehicle-mounted apparatus 10 via the wireless network 30. The wireless I/F 21 is an interface for the above communication and is a wireless communication circuit, for example.

The sensor 22 is mounted on the roadside device 20 and acquires position information of the roadside device 20 and periphery information. In this embodiment, the sensor 22 has a distance measurement sensor such as a laser range finder, a millimeter-wave sensor, or an ultrasonic distance measurement device, for example, and acquires observed values such as the distance from the roadside device 20 to a surrounding object thereof and an object shape. Further, the sensor 22 has a Global Positioning System (GPS) receiver and acquires position information such as the latitude, longitude, and altitude of the roadside device 20. Further, the sensor 22 may further have an imaging device such as a camera or a stereo camera, for example. In this case, the sensor 22 may detect a lane, a traffic signal, a sign, and so forth on the road R and acquire information such as the positions and colors of the lane, traffic signal, and sign.

The position information acquisition unit 23 acquires physical position information about the position in which the roadside device 20 is placed. The physical position information may be two-dimensional position information or may be three-dimensional position information. The position information acquisition unit 23 may acquire the position information of the roadside device 20 based on the position information received by the GPS receiver of the sensor 22. Alternatively, the position information acquisition unit 23 may estimate the position of the roadside device 20 on a map based on the distance and direction between the roadside device 20 and a surrounding object, which are acquired by the distance measurement sensor of the sensor 22, and map information of a periphery of the roadside device 20 that is stored by the roadside device periphery map management unit 26, which will be described later. Alternatively, the position information acquisition unit 23 may estimate the position of the roadside device 20 on the map based on the distance and direction between the roadside device 20 and a surrounding object, which are acquired by using the stereo camera of the imaging device, and the map information of a periphery of the roadside device 20. The position information acquisition unit 23 or the roadside device periphery map management unit 26 may retain the position information of the roadside device 20 that is in advance set by a placing party of the roadside device 20.

The position information delivery unit 24 periodically sends the position information of the roadside device 20 that is acquired by the position information acquisition unit 23. Specifically, the position information delivery unit 24 describes the position information in a radio beacon and broadcasts the position information to the wireless network 30 via the wireless I/F 21. Although not limited, in this embodiment, the position information of the roadside device 20 is distributed to the vehicle-mounted apparatuses of plural vehicles in the wireless network 30 through an extended service set (ESS), which is one example of a wide area network which has plural roadside devices 20 as access points. Accordingly, the vehicle-mounted apparatus of each vehicle may acquire the position information of the roadside device 20 from each of the roadside devices 20 without a special communication license. Thus, the vehicle-mounted apparatus 10 of the vehicle 1 as one of plural vehicles may acquire the position information of the roadside device 20 from each of the roadside devices 20.

Figure 3:
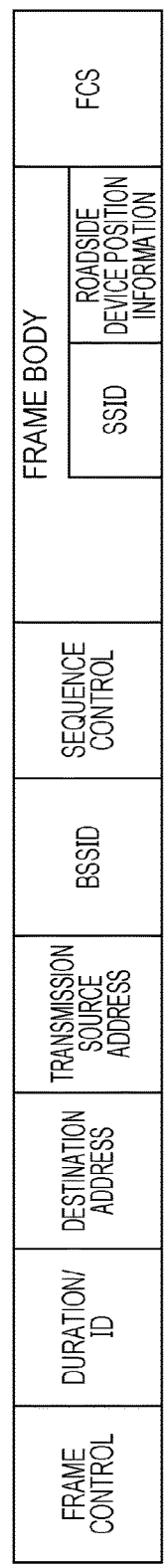
FIG. 3 is a diagram that illustrates one example of a radio beacon which is generated by a position information delivery unit and uses a standard of IEEE 802.11 series.

For example, the position information delivery unit 24 describes the position information of the roadside device 20 and a radio ID of the network that has only the roadside device 20 as the access point in a position information notification beacon as one example of a radio beacon as illustrated in FIG. 3 and broadcasts the position information notification beacon. FIG. 3 illustrates one example of a radio beacon which is generated by the position information delivery unit 24 and uses a standard of IEEE 802.11 series. In the position information notification beacon, the radio ID of the roadside device 20 is a service set identifier (SSID). Such a position information notification beacon is used, the position information of the roadside device 20 may thereby be described in a frame body of a radio frame, and broadcast of the position information is possible by broadcast via the wireless network 30. Further, because the SSID as the radio ID and the position information are distributed as a set, it is possible to notify the vehicle-mounted apparatus 10 of which roadside device 20 is present in which position on the map. The position information notification beacon is received, and the vehicle-mounted apparatus 10 thereby may recognize the position of the roadside device 20 before individually connecting with the roadside device 20 via the wireless network 30 and may select the roadside device 20 to connect with based on the position of the roadside device 20 although details will be described later.

Note that in the position information notification beacon, frame control indicates information of a media access control (MAC) frame, and duration/ID indicates a scheduled period in which a wireless communication line is used. A destination address indicates a destination MAC address, a transmission source address indicates a transmission source MAC address, that is, the MAC address of the roadside device 20. A basic service set identifier (BSSID) indicates an identifier of a wireless cell and indicates the MAC address of an access point, for example. Sequence control indicates a sequence number and indicates a serial number given to a packet, for example. A frame body indicates data of a MAC frame and includes the SSID that indicates the radio ID and the position information of the roadside device 20 in this embodiment. A frame check sequence (FCS) indicates an error correction code of the MAC frame. The information amount of such a position information notification beacon may be regulated to a small amount, and the load to the network may thus be regulated to a low load.

The periphery information processing unit 25 sends information about a peripheral environment of the roadside device 20. For example, the periphery information processing unit 25 specifies a peripheral moving body of the roadside device 20 and a temporary obstacle and sends information about the positions of the specified moving body and obstacle. Specifically, the periphery information processing unit 25 specifies whether or not the object is a moving body based on detection information of the distance measurement sensor and/or the imaging device of the sensor 22 and specifies the kind of the moving body such as a vehicle, a person, or a bicycle in a case where the object is the moving body. In a case where the kind of the moving body may not be specified due to blockage to which the sensor 22 is subject, the resolution of the sensor 22, or the like, the periphery information processing unit 25 may simply specify the object as a type such as a moving body or an object. In addition, the periphery information processing unit 25 estimates the position of the specified moving body over time and continuously sends the position information of the estimated moving body. The periphery information processing unit 25 may cause the map information to reflect the position information of the moving body and the obstacle and send the information.

Further, in a case where the object is not a moving body, the periphery information processing unit 25 estimates the position of the object and collates the estimated position of the object with the map stored in the roadside device periphery map management unit 26. In a case where the estimated position of the object matches the position of a non-moving object such as a building on the map, the periphery information processing unit 25 assesses the object as a non-moving object on the map. In a case where the position of the estimated object does not match the position of a non-moving object on the map, the periphery information processing unit 25 assesses the object as an obstacle that is temporarily placed. Then, the periphery information processing unit 25 sends the position information of the obstacle. Note that the periphery information processing unit 25 may specify the kind of the obstacle based on a detection result of the imaging device of the sensor 22 and send the kind of the obstacle with the position information.

Similarly to the estimation of the position of the roadside device 20 by the position information acquisition unit 23, the estimation of the positions of the moving body and the obstacle may be performed based on the detection information of the distance measurement sensor and/or the imaging device of the sensor 22 and the map information of a periphery of the roadside device 20 that is stored in the roadside device periphery map management unit 26, which will be described later. Although details will be described later, when individual wireless connection between the roadside device 20 and the vehicle-mounted apparatus 10 is established, the periphery information processing unit 25 transmits the position information of the moving body and the obstacle to the vehicle-mounted apparatus 10 via the wireless I/F 21 and the wireless network 30. The periphery information processing unit 25 may accept individual wireless connection from the vehicle-mounted apparatus 10 to the roadside device 20 and authenticate the wireless connection with the vehicle-mounted apparatus 10.

Further, the periphery information processing unit 25 may send information about peripheral structures of the roadside device 20. For example, the periphery information processing unit 25 may send information such as the positions and dimensions of road structures such as a roadway, a sidewalk, and a guardrail and lane information of the roadway based on the detection information of the distance measurement sensor and/or the imaging device of the sensor 22 and the map information.

The roadside device periphery map management unit 26 is a database that stores and manages the map information of a periphery of the roadside device 20. The map information may include information of a high-precision map that reflects detailed information which includes the positions, dimensions, shapes, and so forth about peripheral roads, buildings, and so forth of the roadside device 20. The information about a road may include the number of lanes of the road, the position of a stop line, the positions of a crosswalk and a sidewalk, the position of a bikeway, the kind of the road, a speed limit of the road, an accident history of the road, and so forth. The kinds of the road may include kinds related to road structures such as an ordinary road, an automobile road, and a highway and may include kinds related to road environments such as a community road, an urban road, a suburban road, and a mountain road.

The vehicle-mounted apparatus 10 includes a wireless interface (I/F) 11, a roadside device position analysis unit 12, a roadside device connection unit 13, a roadside device information processing unit 14, a route decision unit 15, and a map management unit 16. The roadside device position analysis unit 12 is one example of a roadside device information analysis unit.

The wireless I/F 11 wirelessly communicates with the roadside device 20 via the wireless network 30. The wireless I/F 11 is an interface for the above communication and is a wireless communication circuit, for example. Note that plural wireless I/Fs 11 may be mounted.

In the wireless network 30, the roadside device position analysis unit 12 receives pieces of information that are broadcast from the plural roadside devices 20 via the ESS or the like and acquires the respective pieces of position information of the roadside devices 20 and the respective radio IDs of the roadside devices 20, which are included in the pieces of information. The roadside device position analysis unit 12 sorts the roadside devices 20 that are positioned in a periphery of a planned traveling route from the planned traveling route which is decided by the route decision unit 15 described later and in which the vehicle 1 travels and the acquired position information of each of the roadside devices 20. The roadside devices 20 that are positioned in a periphery of the planned traveling route may be the roadside devices 20 that are positioned within a prescribed distance from the planned traveling route or may be the roadside devices 20 whose detection ranges include the planned traveling route, for example.

Then, the roadside device position analysis unit 12 instructs the roadside device connection unit 13 to perform wireless connection with the sorted roadside devices 20. In a case where the plural wireless I/Fs 11 are mounted, the roadside device position analysis unit 12 may instruct the roadside device connection unit 13 to perform simultaneous wireless connection between all the sorted roadside devices 20 and the vehicle-mounted apparatus 10 while the number of mounted wireless I/Fs 11 is set as the upper limit or may instruct the roadside device connection unit 13 to perform wireless connection between the roadside device 20 nearest to the vehicle 1 and the vehicle-mounted apparatus 10 in accordance with the travel of the vehicle 1. Further, for the roadside device 20 about which the relationship between the planned traveling route and the position of the roadside device 20 becomes irrelevant, the roadside device position analysis unit 12 instructs the roadside device connection unit 13 to disconnect the wireless connection between the roadside device 20 and the vehicle-mounted apparatus 10.

The roadside device 20 about which the relationship between the planned traveling route and the position of the roadside device 20 becomes irrelevant may be the roadside device 20 that is separately positioned from the planned traveling route by more than a first prescribed distance, may be the roadside device 20 whose detection range does not include the planned traveling route, may be the roadside device 20 that is separately positioned from the vehicle 1 by more than a second prescribed distance, or may be the roadside device 20 that is separately positioned from the vehicle 1 by more than a third prescribed distance, for example. The first prescribed distance may be a distance in which a scanning result of the planned traveling route by the roadside device 20 may not sufficiently be obtained. The second prescribed distance may be a distance in which wireless communication between the roadside device 20 and the vehicle-mounted apparatus 10 becomes unstable. The third prescribed distance may be a scanning radius of the roadside device 20. Because the vehicle 1 travels and the planned traveling route thereby changes, the above-described roadside device 20 occurs. Alternatively, also in a case where the planned traveling route is changed due to a change of destination, the above-described roadside device 20 may occur.

The roadside device connection unit 13 establishes or disconnects the wireless connection between the vehicle-mounted apparatus 10 and the roadside device 20 via the wireless network 30 while following an instruction from the roadside device position analysis unit 12. Although not limited, in this embodiment, the wireless connection between the vehicle-mounted apparatus 10 and the roadside device 20 is wireless connection that uses a basic service set (BSS), which is one example of a network which has only one roadside device 20 as the access point, in the wireless network 30. The roadside device connection unit 13 performs wireless connection with the roadside device 20 based on the SSID, which is the radio ID of the roadside device 20 to connect with. The wireless connection between the roadside device 20 and the vehicle-mounted apparatus 10, that is, the wireless connection between the roadside device 20 and the roadside device connection unit 13 may be encrypted. In this case, the roadside device connection unit 13 may transmit to the roadside device 20 an encryption key or a security key that corresponds to the SSID and establish the connection by being authenticated by the roadside device 20. Because the roadside device 20 and the roadside device connection unit 13 are wirelessly connected individually, even in a case where information with a large data amount is transmitted and received between each other, lowering of the communication speed of the network is regulated.

The roadside device information processing unit 14 receives information that is transmitted from the roadside device 20 when the wireless connection is performed between the vehicle-mounted apparatus 10 and the roadside device 20 via the BSS and causes the information to be reflected on control of movement and so forth of the vehicle 1. The roadside device information processing unit 14 may report the received information to a driver. The information that is received is information that is processed by the periphery information processing unit 25 of the roadside device 20 and may include outside environment information of the roadside device 20 such as information about peripheral moving bodies and obstacles of the roadside device 20 and map information of those, for example. The roadside device information processing unit 14 may transmit information of the vehicle 1 to the roadside device 20 and receive the information that corresponds to the vehicle 1 from the roadside device 20. For example, the information of the vehicle 1 may include information such as a form of the vehicle 1 such as a large-sized vehicle, a standard-sized vehicle, a small-sized vehicle, a two-wheeled vehicle, or a light vehicle, a category of the vehicle 1 such as a bus, a taxi, or an ordinary vehicle, and a vehicle type of the vehicle 1. Accordingly, for example, it becomes possible to acquire, from the roadside device 20, information about passage of the vehicle 1 such as whether or not the road is passable for the vehicle 1 and the speed limit.

The route decision unit 15 manages the planned traveling route in which the vehicle 1 travels, which is decided by using a car navigation device or the like mounted on the vehicle 1. In addition, the route decision unit 15 acquires the position information of the vehicle 1 by using a car navigation device or the like mounted on the vehicle 1, associates the planned traveling route with the position of the vehicle 1, and manages the associated information.

The map management unit 16 is a database that stores and manages the map information. The map information may include information of a high-precision map that reflects detailed information which includes the positions, dimensions, shapes, and so forth about roads, buildings, and so forth. The information about a road may include the number of lanes of the road, the position of a stop line, the positions of a crosswalk and a sidewalk, the position of a bikeway, the kind of the road, a speed limit of the road, an accident history of the road, and so forth. The kinds of the road may include kinds related to road structures such as an ordinary road, an automobile road, and a highway and may include kinds related to road environments such as a community road, an urban road, a suburban road, and a mountain road.

A portion or all of configuration elements of the roadside device position analysis unit 12, the roadside device connection unit 13, the roadside device information processing unit 14, and the route decision unit 15 of the vehicle-mounted apparatus 10 and the position information acquisition unit 23, the position information delivery unit 24, and the periphery information processing unit 25 of the roadside device 20 may be realized by hardware such as an electronic circuit or an integrated circuit or may be realized by software such as a program that is executed on a computer. For example, the above configuration elements may be configured with a computer system (not illustrated) that is formed with a CPU, a random access memory (RAM), a read-only memory (ROM), and so forth. The CPU uses the RAM as a working memory to execute a program recorded in the ROM, and a portion or all of functions of the above configuration elements may thereby be achieved. The program may be provided as an application by communication via a communication network such as the Internet, communication by a mobile communication standard or the like.

It is sufficient that the map management unit 16 of the vehicle-mounted apparatus 10 and the roadside device periphery map management unit 26 of the roadside device 20 may store information, and the map management unit 16 and the roadside device periphery map management unit 26 may be semiconductor memories or hard disk drives. Alternatively, the map management unit 16 and the roadside device periphery map management unit 26 may be arranged in separate places from the vehicle-mounted apparatus 10 and the roadside device 20. The map management unit 16 and the roadside device periphery map management unit 26 may be included in a server device that performs wireless communication or wired communication with the vehicle-mounted apparatus 10 and the roadside device 20 and that are not illustrated or may be arranged on a cloud server.

Further, the vehicle-mounted apparatus 10 may be mounted on the vehicle 1 as a single device such as a computer device or may be incorporated in a computer device such as an electronic control unit (ECU) that is mounted on the vehicle 1. The vehicle-mounted apparatus 10 may be realized by hardware such as an electronic circuit or an integrated circuit or may be realized by software such as a program that is executed on a computer.

Figure 4:
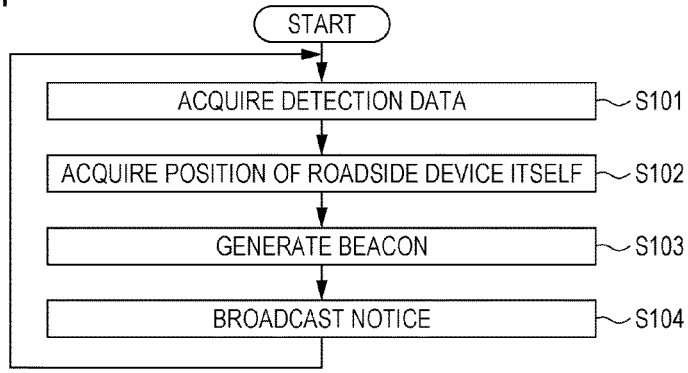
FIG. 4 is a flowchart that illustrates one example of an action flow of a roadside device.
Figure 5:
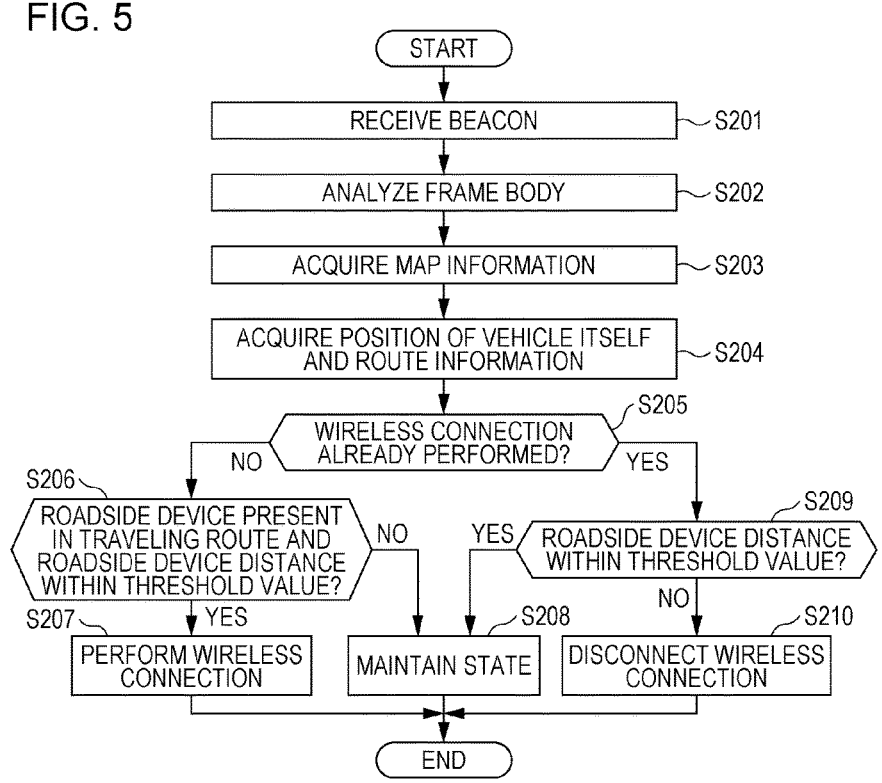
FIG. 5 is a flowchart that illustrates one example of an action flow of a vehicle-mounted apparatus.

Next, mainly referring to FIG. 4 and FIG. 5, an action of the communication system 100 according to the first embodiment will be described. FIG. 4 is a flowchart that illustrates one example of an action flow of the roadside device 20. FIG. 5 is a flowchart that illustrates one example of an action flow of the vehicle-mounted apparatus 10.

Referring to FIG. 1 and FIG. 4, an action of the roadside device 20 of the communication system 100 will be described. In step S101, the sensor 22 of the roadside device 20 performs detection at each regular time interval and acquires detection data. For example, the sensor 22 acquires the position information such as the latitude, longitude, and altitude of the roadside device 20 that is detected by the GPS receiver. Alternatively, the sensor 22 acquires the position information of a surrounding object of the roadside device 20, which is detected by the distance measurement sensor. In a case where the distance measurement sensor is a laser range finder, for example, the distance measurement sensor irradiates the surrounding with laser and calculates the relative position of a surrounding object with respect to the roadside device 20 based on reflected waves of the laser that contacts the surrounding object, is reflected by that, and returns. Accordingly, the point cloud data of the surrounding object that are collective data of points of the reflection positions are obtained. The point cloud data include the positional relationship between the points and the roadside device 20.

In step S102, the position information acquisition unit 23 of the roadside device 20 acquires the position of the roadside device 20 itself based on the detection result of the sensor 22. In a case where the position information acquisition unit 23 acquires the position information such as the latitude, longitude, and altitude of the roadside device 20 from the GPS receiver of the sensor 22, the position information acquisition unit 23 uses such pieces of information without any change, thereby acquires the position of the roadside device 20 itself, and maps the position of the roadside device 20 in the map information that is retained by the roadside device periphery map management unit 26. In a case where the position information acquisition unit 23 acquires the position information of the roadside device 20 from the distance measurement sensor of the sensor 22, the position information acquisition unit 23 compares the point cloud data of the surrounding object with the point cloud data of the surrounding object that are in advance measured and estimates the position of the roadside device 20. In addition, the position information acquisition unit 23 expresses the estimated position by the latitude and longitude and maps the position of the roadside device 20 in the map information that is retained by the roadside device periphery map management unit 26.

In step S103, the position information delivery unit 24 of the roadside device 20 describes the position information of the roadside device 20, which is related with the map information in step S102, and wireless information such as the radio ID in the radio frame and generates a beacon frame. For example, the position information notification beacon as one example of the beacon frame is illustrated in FIG. 3.

Then, in step S104, the position information delivery unit 24 broadcasts the generated beacon to the wireless network 30 via the wireless I/F 21. The position information delivery units 24 of the plural roadside devices 20 transmit the generated beacons to the network that has the plural roadside devices 20 as the access points in the wireless network 30. Each of the roadside devices 20 repeats processes of steps S101 to S104 and generates and broadcasts the beacon at each regular time in which the sensor 22 performs a detection action.

Referring to FIG. 1 and FIG. 5, an action of the vehicle-mounted apparatus 10 of the communication system 100 will be described. In step S201, the roadside device position analysis unit 12 of the vehicle-mounted apparatus 10 receives the beacon that is broadcast from each of the roadside devices 20 via the wireless I/F 11. Next, in step S202, the roadside device position analysis unit 12 analyzes a frame body of the beacon from each of the roadside device 20, which is illustrated in FIG. 3, and acquires the SSID as the radio ID and the position information of the roadside device 20.

Next, in step S203, the roadside device position analysis unit 12 acquires the map information from the map management unit 16. In addition, in step S204, the roadside device position analysis unit 12 acquires information of the planned traveling route of the vehicle 1 and information of the present position of the vehicle 1 from the route decision unit 15. The roadside device position analysis unit 12 may acquire the information of the present position of the vehicle 1 from an in-vehicle car navigation device. Then, the roadside device position analysis unit 12 maps the planned traveling route and the present position of the vehicle 1 on the map that is acquired in step S203.

Next, in step S205, the roadside device position analysis unit 12 assesses whether or not wireless connection is performed between the vehicle-mounted apparatus 10 and the roadside device 20. This wireless connection is wireless connection that uses the BSS, for example. The roadside device position analysis unit 12 moves to step S206 in a case where the wireless connection is not yet performed (NO in step S205) but moves to step S209 in a case where the wireless connection is already performed (YES in step S205).

In step S206, the roadside device position analysis unit 12 assesses whether or not the roadside device 20 which is present in the planned traveling route of the vehicle 1 and whose distance from the vehicle 1 is within a threshold value is present. Presence of the roadside device 20 in the planned traveling route may include not only a case where the roadside device 20 is present within several meters from the road in the planned traveling route such as a case where the roadside device 20 is present on a side of, above, or below the road in the planned traveling route but also a case where the roadside device 20 is present within the above first prescribed distance from the road in the planned traveling route. Presence of the roadside device 20 in the distance within the threshold value from the vehicle 1 may mean the presence of the roadside device 20 in the position from the vehicle 1 within the above second prescribed distance, in which stable wireless communication between the roadside device 20 and the vehicle 1 may be established. Alternatively, presence of the roadside device 20 in the distance within the threshold value from the vehicle 1 may mean the presence of the roadside device 20 in the position from the vehicle 1 within the above third prescribed distance, which is the detection range of the roadside device 20. Note that in any case, the above threshold value may be changed in response to the speed of the vehicle 1. For example, because the change in the distance between the vehicle 1 and the roadside device 20 becomes larger as the speed of the vehicle 1 becomes higher, the above threshold may be made larger.

In a case where the roadside device 20 is present in the planned traveling route and whose distance from the vehicle 1 is within the threshold value (YES in step S206), the roadside device position analysis unit 12 moves to step S207 and instructs the roadside device connection unit 13 of the vehicle-mounted apparatus 10 to conduct wireless connection with the roadside device 20. In a case where the plural roadside devices 20 are present, the roadside device position analysis unit 12 may instruct the roadside device connection unit 13 to conduct simultaneous wireless connection between all the roadside devices 20 and the vehicle-mounted apparatus 10 or may instruct the roadside device connection unit 13 to conduct wireless connection between the roadside device 20 nearest to the vehicle 1 and the vehicle-mounted apparatus 10. The roadside device connection unit 13 establishes the instructed wireless connection with the roadside device 20 via the wireless I/F 11 and the wireless network 30. After the wireless connection is established, the roadside device information processing unit 14 of the vehicle-mounted apparatus 10 acquires the information about peripheral moving bodies and obstacles of the roadside device 20 and the outside environment information of the roadside device 20 such as the map information of those, and the vehicle-mounted apparatus 10 causes the acquired information to be reflected on control of the vehicle 1.

In a case where the roadside device 20 which is present in the planned traveling route and whose distance from the vehicle 1 is within the threshold value is not present (NO in step S206), the roadside device position analysis unit 12 moves to step S208. Then, the roadside device position analysis unit 12 maintains the wireless connection state of the vehicle-mounted apparatus 10 in the present state, that is, maintains a state where wireless connection is not yet established.

In step S209, the roadside device position analysis unit 12 assesses whether or not the distance of the roadside device 20 in wireless connection with the vehicle-mounted apparatus 10 from the vehicle 1 is within a threshold value. This threshold value may be the same as the threshold value in step S206. In a case where the above distance is within the threshold value (YES in step S209), the roadside device position analysis unit 12 moves to step S208 and maintains the wireless connection between the above roadside device 20 and the vehicle-mounted apparatus 10. In a case where the above distance is more than the threshold value (NO in step S209), the roadside device position analysis unit 12 moves to step S210 and instructs the roadside device connection unit 13 to disconnect the wireless connection between the above roadside device 20 and the vehicle-mounted apparatus 10. Then, the roadside device connection unit 13 disconnects the wireless connection.

By performing processes of steps S201 to S210, even in a state the vehicle 1 is moving, the vehicle-mounted apparatus 10 extracts the roadside device 20 which is present in the planned traveling route of the vehicle 1 and whose distance from the vehicle 1 is within the threshold value and performs wireless connection with the extracted roadside device 20. Further, the vehicle-mounted apparatus 10 may perform wireless connection with the roadside device 20 that is related to movement of the vehicle 1 even in a case where the vehicle-mounted apparatus 10 does not in advance retain the position of each of the roadside devices 20.

For example, referring to FIG. 2, the vehicle-mounted apparatus 10 of the vehicle 1 that runs along the planned traveling route first performs wireless connection with the roadside device 20C and next performs wireless connection with the roadside device 20B. However, the vehicle-mounted apparatus 10 does not perform wireless connection with the roadside device 20A that is separate from the planned traveling route. In such a manner, the vehicle-mounted apparatus 10 may select the roadside device 20 that is an appropriate access point and perform wireless connection.

Second Embodiment

A communication system 200 according to a second embodiment will be described. The communication system 200 according to the second embodiment is different from the first embodiment in a point that a beacon generated by a roadside device includes not only the position information of the roadside device but also information of a detection range of the roadside device. In the following, different points from the first embodiment will mainly be described.

Figure 6:
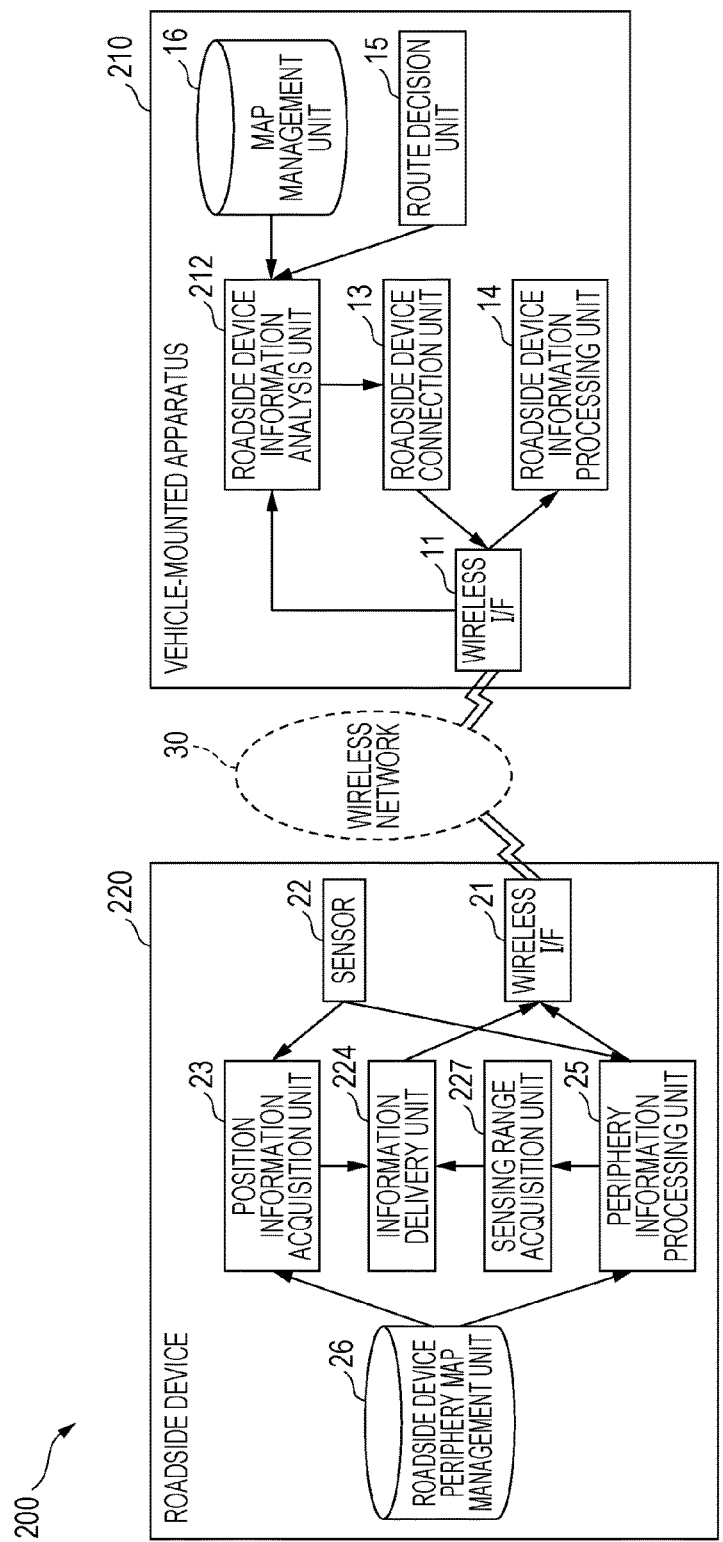
FIG. 6 is a block diagram that illustrates one example of a functional configuration of a communication system according to a second embodiment.

Referring to FIG. 6, a roadside device 220 of the communication system 200 according to the second embodiment includes the wireless I/F 21, the sensor 22, the position information acquisition unit 23, an information delivery unit 224, the periphery information processing unit 25, the roadside device periphery map management unit 26, and a sensing range acquisition unit 227. Note that FIG. 6 is a block diagram that illustrates one example of a functional configuration of the communication system 200 according to the second embodiment.

The sensing range acquisition unit 227 acquires information about a sensing range (also referred to as detection range) that is a range observed by the roadside device 220 by using the sensor 22 from the periphery information processing unit 25. Further, the sensing range acquisition unit 227 may specify the position of the sensing range by acquiring the position information of the roadside device 220 from the position information acquisition unit 23 or may estimate the position of the sensing range based on detection information of the sensor 22 and map information.

Figure 7:
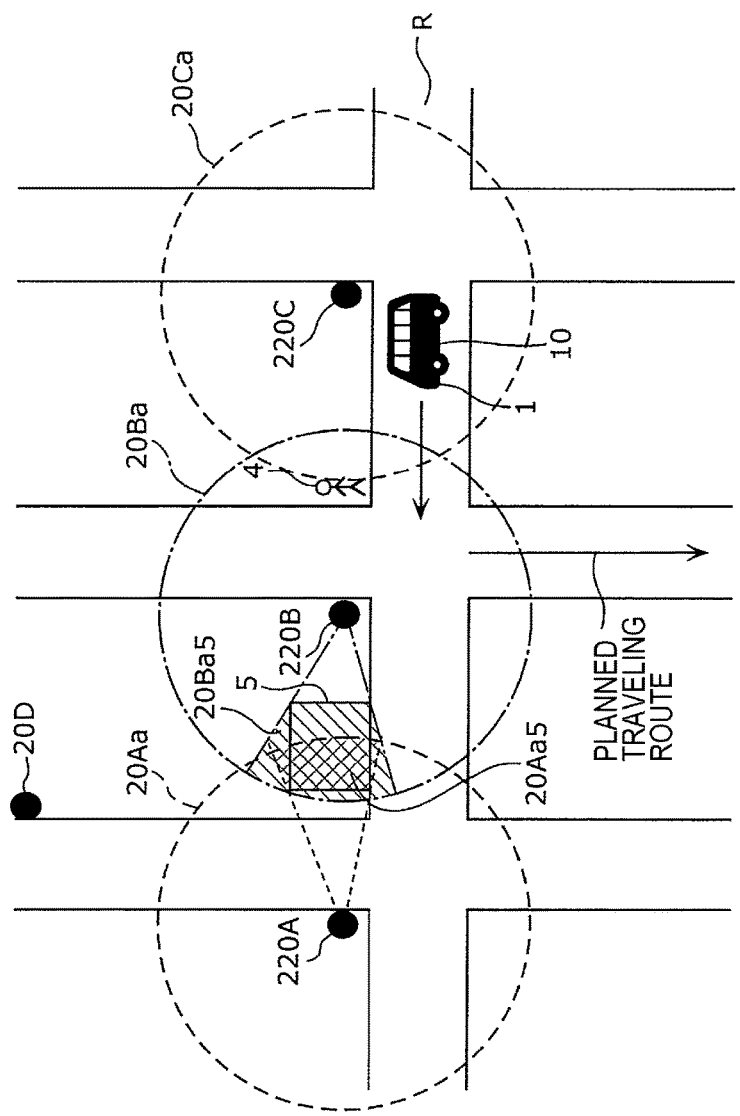
FIG. 7 is a schematic diagram that illustrates an application example of the communication system according to the second embodiment.

Information of the sensing range may include information of a detection radius by the sensor 22 from the roadside device 220. This information of the detection radius may be region information of a circle that has the detection radius or may be information of the region, in which the regions which may not be detected by the sensor 22 are removed from the region of the circle. For example, referring to FIG. 7, a roadside device 220A has a detection range of a circle region 20Aa but may not scan a region 20Aa5 (the hatched region by right-down oblique lines in FIG. 7) by sensor 22 due to an influence of a building 5. Note that FIG. 7 is a schematic diagram that illustrates an application example of the communication system 200 according to the second embodiment. Further, a roadside device 220B has a detection range of a circle region 20Ba but may not detect a region 20Ba5 (the hatched region by right-up oblique lines in FIG. 7) by sensor 22 due to the influence of the building 5. For example, in a state where the region in which the region 20Aa5 is removed from the circle region 20Aa is set as the detection range of the roadside device 220A and is mapped on the map, the detection range may thereby be sent by the sensing range acquisition unit 227. For example, the regions 20Aa5 and 20Ba5 are calculable from the point cloud data of a surrounding object that are acquired by the sensor 22.

Further, the information of the sensing range may include information of an area that is recorded in the map in the detection range of the sensor 22. For example, on the map, IDs may be in advance allocated to areas related to roads such as a roadway, a sidewalk, a roadside margin, a bikeway, a parking lane, and a crosswalk as information of areas. This ID may be given in accordance with common rules, include kinds of areas, and further include position information of areas. Accordingly, it is possible to distinguish the kind and the position of the area on the road by checking the map and the ID.

Further, the information of the sensing range may include information about a lane of a road related to the detection range of the sensor 22. For example, the periphery information processing unit 25 assesses whether or not the sensor 22 senses the region that has an influence on the lane on which the vehicle may run. This influence may include a direct influence in which the lane is included in the detection range of the sensor 22 and an indirect influence in which the lane is not included in the detection range of the sensor 22. The indirect influence may occur in a case where a road that intersects the lane, a lane that merges with or branches off the lane, or the like is included in the detection range of the sensor 22, for example. In a case where the sensor 22 performs the above sensing, the periphery information processing unit 25 may extract a lane number that is in advance given on the map for the lane that is influenced by the sensing by the sensor 22 and include the lane number in the information of the sensing range.

The information delivery unit 224 describes the position information of the roadside device 220, which is acquired by the position information acquisition unit 23, and the information of the sensing range, which is acquired by the sensing range acquisition unit 227, in a radio beacon and periodically broadcasts those pieces of information. Similarly to the position information delivery unit 24 according to the first embodiment, the information delivery unit 224 delivers information in the wireless network 30 through the ESS as one example of the network that has plural roadside devices 220 as access points.

Further, a vehicle-mounted apparatus 210 includes the wireless I/F 11, a roadside device information analysis unit 212, the roadside device connection unit 13, the roadside device information processing unit 14, the route decision unit 15, and the map management unit 16.

The roadside device information analysis unit 212 acquires the information of the sensing range and the position information of the roadside device 220, which are broadcast from the information delivery unit 224 of each of the roadside devices 220. Further, the roadside device information analysis unit 212 sorts only the roadside devices 220 which satisfy conditions about the position of the roadside device 220 as with the first embodiment and whose information of the sensing range is related to the planned traveling route of the vehicle 1 and performs wireless connection with the sorted roadside devices 220. Similarly to the first embodiment, the wireless connection is wireless connection that uses the BSS, which is one example of a network which has only one roadside device 220 as the access point.

Then, the roadside device information analysis unit 212 instructs the roadside device connection unit 13 to perform wireless connection with the sorted roadside devices 220. The roadside device information analysis unit 212 may instruct the roadside device connection unit 13 to perform simultaneous wireless connection between all the sorted roadside devices 220 and the vehicle-mounted apparatus 210 or may instruct the roadside device connection unit 13 to perform wireless connection between the roadside device 220 nearest to the vehicle 1 and the vehicle-mounted apparatus 210 in accordance with the travel of the vehicle 1. Further, for the roadside device 220 about which the relationship between the planned traveling route and the position of the roadside device 220 becomes irrelevant, the roadside device information analysis unit 212 instructs the roadside device connection unit 13 to disconnect the wireless connection between the roadside device 220 and the vehicle-mounted apparatus 210.

Note that the relation of the information of the sensing range of the roadside device 220 with the planned traveling route of the vehicle 1 may be assessed based on information of the detection radius from the roadside device 220. In a case where the detection range of the roadside device 220, which is included in the information of the detection radius from the roadside device 220, includes the planned traveling route of the vehicle 1, the roadside device information analysis unit 212 may assume that the above relation is present.

The relation of the information of the sensing range of the roadside device 220 with the planned traveling route of the vehicle 1 may be assessed based on information of the area recorded in the map in the detection range of the sensor 22. The roadside device information analysis unit 212 may assess whether or not the area is related with the planned traveling route of the vehicle 1 based on the kind and position of the area that are broadcast from the information delivery unit 224. For example, in a case where the information of the area is information only about sidewalks and pedestrian roads, the roadside device information analysis unit 212 does not select the roadside device 220 even in a case where the position of the area or the roadside device 220 is in the planned traveling route. That is, in a case where the roadside device 220 sends the information of the sensing range that includes the information of a roadway and an area related with a roadway of the planned traveling route, the roadside device 220 becomes a target of wireless connection.

The relation of the information of the sensing range of the roadside device 220 with the planned traveling route of the vehicle 1 may be assessed based on information about the lanes of the road that are related with the detection range of the sensor 22. For example, in a case where the information of the sensing range includes lane information of the road of the planned traveling route but includes only information of lanes in the opposite direction to the traveling direction, the roadside device information analysis unit 212 does not select the roadside device 220 even in a case where the position or the detection range of the roadside device 220 is in the planned traveling route. That is, in a case where the roadside device 220 sends the information of the sensing range that includes the information of the lanes which are positioned in the planned traveling route and whose traveling direction matches the traveling direction of the vehicle 1, the roadside device 220 becomes the target of wireless connection.

Thus, the vehicle-mounted apparatus 210 uses not only the position information of the roadside device 220 but also the information of the sensing range of the roadside device 220 as the basis for determination for sorting the roadside device 220 with which wireless connection is performed. Accordingly, for example, the vehicle-mounted apparatus 210 does not perform wireless connection with the roadside device 220 that is positioned in the planned traveling route but does not provide effective sensing results for running of the vehicle 1 because the roadside device 220 is covered by a building. Accordingly, unnecessary communication is reduced.

Further, as illustrated in FIG. 7, the vehicle-mounted apparatus 210 acquires the detection range of the roadside device 220, from which the range which may not be scanned by the sensor 22 is removed, and may thereby select the roadside devices 220 such that neighboring detection ranges partially overlap. That is, the detection ranges of the selected roadside devices 220 are contiguous. Accordingly, even in a case where the vehicle-mounted apparatus 210 sequentially performs connection and disconnection of wireless connection with respect to the plural roadside devices 220 while moving together with the vehicle 1, as for the information about the planned traveling route that is acquired from the plural roadside devices 220, occurrence of a region that lacks information may be regulated. In addition, in a case where wireless connection is switched from a certain roadside device 220 to the neighboring roadside device 220, the vehicle-mounted apparatus 210 may perform control of connection and disconnection of wireless connection at a requested timing that avoids discontinuity of information.

Other Modification Examples

In the foregoing, a description has been made about the communication systems and so forth according to one or plural aspects of the present disclosure. However, the present disclosure is not limited to those embodiments. Modes in which various kinds of modifications conceived by persons having ordinary skill in the art are applied to the embodiments and modes that are configured by combining configuration elements in different embodiments may be included in the scope of the one or plural aspects of the present disclosure unless the modes depart from the gist of the present disclosure. For example, cases in the following are included in the present disclosure.

(1) The communication systems according to the first and second embodiments are applied to wireless communication between the roadside device and the vehicle-mounted apparatus. However, embodiments are not limited to this. For example, the communication system may be applied to wireless communication between an infra-structure device on an information sending side and a terminal device on an information receiving side. The terminal device may be a portable computer such as a smartphone or a tablet, for example.

(2) The above devices are specifically computer systems or electronic circuits that are configured with a microprocessor, a ROM, a RAM, a hard disk unit, a display unit, a keyboard, a touch panel, and so forth. The above RAM or hard disk unit stores a computer program. The above microprocessor acts in accordance with the above computer program, and the devices thereby achieve their functions. Here, the computer program is configured by combining plural order codes that indicate instructions for a computer in order to achieve a prescribed function.

(3) A portion of or all configuration elements that configure the above devices may be configured with one system large scale integration (LSI). A system LSI is a super multi-function LSI that is manufactured by integrating plural configuration units on one chip and is specifically a computer system configured to include a microprocessor, a ROM, a RAM, and so forth. The above RAM stores a computer program. The above microprocessor acts in accordance with the above computer program, and the system LSI thereby achieves its function.

(4) A portion of or all configuration elements that configure the above devices may be configured with IC cards or individual modules that are detachable from the devices. The above IC card or the above module is a computer system that is configured with a microprocessor, a ROM, a RAM, and so forth. The above IC card or the above module may include the above super multi-function LSI. The microprocessor acts in accordance with a computer program, and the above IC card or the above module thereby achieves its function. This IC card or this module may be tamper-resistant.

(5) The present disclosure may be a computer program that realizes the processes described above by a computer or may be digital signals that are configured with the above computer program.

Further, the present disclosure may be the above computer program or the above digital signals that are recorded in computer-readable recoding media such as a flexible disk, a hard disk, a CD-ROM, an MO, a DVD, a DVD-ROM, a DVD-RAM, a Blu-ray® Disc (BD), or a semiconductor memory, for example. Further, the present disclosure may be the above digital signals that are recorded in those recoding media.

Further, the present disclosure may be the above computer program or the above digital signals that are transmitted via an electric communication line, a wireless or wired communication line, a network represented by the Internet, data broadcasting, and so forth.

Further, the present disclosure may be a computer system that includes a microprocessor and a memory, in which the above memory stores the above computer program and the above microprocessor acts in accordance with the above computer program.

Further, the present disclosure may be conducted by another independent computer system by transferring the above recoding media that record the above program or the above digital signals or by transferring the above program or the above digital signals via the above network and so forth.

(6) All the numerals such as ordinal numbers and amounts that are used in the above are exemplified for specifically describing the techniques of the present disclosure, and the present disclosure is not restricted by the exemplified numerals.

(7) The connection relationships among the configuration elements are exemplified for specifically describing the techniques of the present disclosure, and the connection relationships that realize the functions of the present disclosure are not limited to those.

(8) The divisions of the function blocks in the block diagrams are examples. Plural function blocks may be realized as one function block, one function block may be divided into plural function blocks, or a portion of functions may be moved to another function block. Further, the functions of plural function blocks that have similar functions may be processed by a single piece of hardware or software in parallel or in a time-division manner.

The present disclosure may be used for a communication system and is useful particularly for a communication system in a configuration in which with respect to a transmitter of information, whose position is not in advance recognized, a receiver acquires the position of the transmitter, selects the transmitter based on the acquired position, and performs wireless connection.

What is claimed is:

1. A communication system, comprising:
   a roadside device that is on, above, or below a road; and
   a vehicle-mounted apparatus that is on a vehicle, wherein
   the roadside device includes:
      a sensor that detects a peripheral situation of the roadside device; and
      first processing circuitry that, in operation, performs first operations including:
         acquiring a detection result of the sensor and map information of the roadside device;
         acquiring position information about a position of the roadside device from the detection result of the sensor and the map information of the roadside device;
         broadcasting the position information about the position of the roadside device by wireless communication;
         acquiring periphery information of the roadside device from the detection result of the sensor and the map information of the roadside device;
         authenticating individual wireless connection between the vehicle-mounted apparatus and the roadside device; and
         transmitting the periphery information of the roadside device to the vehicle-mounted apparatus by the individual wireless connection, and
   the vehicle-mounted apparatus includes:
      second processing circuitry that, in operation, performs second operations including:
         acquiring the position information about the position of the roadside device, the position information being broadcast by the wireless communication;
         deciding whether the individual wireless connection is performed between the roadside device and the vehicle-mounted apparatus based on roadside device information, the roadside device information including the position information about the position of the roadside device;
         connecting or disconnecting the individual wireless connection between the vehicle-mounted apparatus and the roadside device based on the deciding; and
         acquiring the periphery information of the roadside device by the individual wireless connection in response to the individual wireless connection being connected.

2. The communication system according to claim 1, wherein
   the first operations further include:
      acquiring range information about a detection range of the roadside device from the detection result of the sensor and the map information of the roadside device; and
      broadcasting the position information about the position of the roadside device and the range information about the detection range by the wireless communication, and
   the second operations further include:
      deciding whether the individual wireless connection is performed between the roadside device and the vehicle-mounted apparatus based on the roadside device information, the roadside device information including the position information about the position of the roadside device and the range information about the detection range.

3. The communication system according to claim 1, wherein
   the second operations further include:
      acquiring information of a planned traveling route of the vehicle, and
   the individual wireless connection is decided to be performed between the roadside device and the vehicle-mounted apparatus in a case where the planned traveling route is related with the roadside device information.

4. The communication system according to claim 1, further comprising:
   plural roadside devices, each of the plural roadside devices being the roadside device, wherein
   the broadcasting is by the wireless communication via a network that includes the plural roadside devices as access points, and
   the individual wireless connection between the roadside device and the vehicle-mounted apparatus is via the network that includes the roadside device as one of the access points.

5. The communication system according to claim 1, wherein the position information about the position of the roadside device is two-dimensional information.

6. The communication system according to claim 1, wherein the position information about the position of the roadside device is three-dimensional information.

7. The communication system according to claim 1, wherein the sensor is a Global Positioning Sensor that acquires the position information about the position of the roadside device.

8. The communication system according to claim 1, wherein
   the sensor is a distance measurement sensor, and
   the position information about the position of the roadside device is acquired by measuring a distance between the roadside device and a surrounding object, and by correlating the measured distance and the surrounding object with the map information.

9. The communication system according to claim 1, wherein
   the sensor is a camera, and
   the position information about the position of the roadside device is acquired by estimating a distance and a direction between the roadside device and a surrounding object, which are acquired via the camera, and by correlating the estimated distance and the direction with the map information.

10. The communication system according to claim 1, wherein the periphery information identifies an obstacle, specifies whether the obstacle is a moving body, and specifies a kind of the moving body.

11. The communication system according to claim 1, wherein
the periphery information identifies an obstacle,
the roadside device estimates a position of the obstacle and collates the position of the obstacle with the map information of the roadside device, and
when the estimated position of the obstacle matches a position of a non-moving object in the map information, the periphery information specifies the obstacle as the non-moving object.

12. The communication system according to claim 1, wherein
the periphery information identifies an obstacle,
the roadside device estimates a position of the obstacle and collates the position of the obstacle with the map information of the roadside device, and
when the estimated position of the obstacle does not match a position of a non-moving object in the map information, the periphery information specifies the obstacle as a temporarily placed object.

13. The communication system according to claim 1, wherein
the second operations further include:
acquiring information of a planned traveling route of the vehicle,
the roadside device information includes the position information about the position of the roadside device and range information about a detection range of the roadside device, and
the individual wireless connection is decided to be connected or disconnected based on whether the detection range includes the planned traveling route.

14. The communication system according to claim 1, wherein
the second operations further include:
acquiring information of a planned traveling route of the vehicle, and
the individual wireless connection is decided to be connected or disconnected based on whether the planned traveling route is more than a distance from the position of the roadside device at which the individual wireless connection becomes unstable.

15. The communication system according to claim 1, wherein
the second operations further include:
acquiring information of a planned traveling route of the vehicle,
the roadside device information includes the position information about the position of the roadside device and scanning information about a scanning radius of the roadside device, and
the individual wireless connection is decided to be connected or disconnected based on whether the scanning radius includes the planned traveling route.

16. A non-transitory computer-readable recording medium that includes a program, the program, when executed by a computer, causing the computer to execute a process comprising:
acquiring position information that is broadcast from a roadside device which is on, above, or below a road by wireless communication, the position information being about a position of the roadside device;
deciding whether individual wireless connection is performed with the roadside device based on the position information about the position of the roadside device;
executing connection or disconnection of the individual wireless connection with the roadside device based on the deciding; and
acquiring periphery information of the roadside device from the roadside device during the individual wireless connection with the roadside device in response to the individual wireless connection being connected, wherein
the periphery information which is acquired during the individual wireless connection is different from the position information that is broadcast from the roadside device and is not yet acquired since acquiring the position information that is broadcast from the roadside device.

17. A vehicle-mounted apparatus that is capable of wireless connection with a roadside device which is on, above, or below a road, the vehicle-mounted apparatus being on a vehicle, the vehicle-mounted apparatus comprising:
storage; and
processing circuitry that, in operation, performs operations including:
acquiring position information that is broadcast from the roadside device by wireless communication, the position information being about a position of the roadside device;
deciding whether individual wireless connection is performed between the roadside device and the vehicle-mounted apparatus based on roadside device information, the roadside device information including the position information about the position of the roadside device;
connecting or disconnecting the individual wireless connection between the vehicle-mounted apparatus and the roadside device based on the deciding; and
acquiring periphery information of the roadside device from the roadside device during the individual wireless connection between the vehicle-mounted apparatus and the roadside device in response to the individual wireless connection being connected, wherein
the individual wireless connection is connected between the vehicle-mounted apparatus and the roadside device, based on the deciding, when the individual wireless connection is not yet performed, and
the individual wireless connection is disconnected between the vehicle-mounted apparatus and the roadside device, based on the deciding, when the individual wireless connection is already performed.

18. A vehicle-mounted apparatus that is capable of wireless connection with a roadside device which is on, above, or below a road, the vehicle-mounted apparatus being on a vehicle, the vehicle-mounted apparatus comprising:
storage; and
processing circuitry that, in operation, performs operations including:
acquiring position information that is broadcast from the roadside device by wireless communication, the position information being about a position of the roadside device;

deciding whether individual wireless connection is performed between the roadside device and the vehicle-mounted apparatus based on roadside device information, the roadside device information including the position information about the position of the roadside device;

connecting or disconnecting the individual wireless connection between the vehicle-mounted apparatus and the roadside device based on the deciding; and acquiring periphery information of the roadside device from the roadside device during the individual wireless connection between the vehicle-mounted apparatus and the roadside device in response to the individual wireless connection being connected, wherein the periphery information which is acquired during the individual wireless connection is different from the position information that is broadcast from the roadside device and is not yet acquired since acquiring the position information that is broadcast from the roadside device.

19. A non-transitory computer-readable recording medium that includes a program, the program, when executed by a computer, causing the computer to execute a process comprising:

acquiring position information that is broadcast from a roadside device which is on, above, or below a road by wireless communication, the position information being about a position of the roadside device;

deciding whether individual wireless connection is performed with the roadside device based on the position information about the position of the roadside device;

executing connection or disconnection of the individual wireless connection with the roadside device based on the deciding; and acquiring periphery information of the roadside device from the roadside device during the individual wireless connection with the roadside device in response to the individual wireless connection being connected, wherein the individual wireless connection is connected between the vehicle-mounted apparatus and the roadside device, based on the deciding, when the individual wireless connection is not yet performed, and the individual wireless connection is disconnected between the vehicle-mounted apparatus and the roadside device, based on the deciding, when the individual wireless connection is already performed.

* * * * *